United States Patent Office 2,974,118
Patented Mar. 7, 1961

2,974,118
PROCESS FOR THE PRODUCTION OF POLYMERS

Günther Nischk, Leverkusen, Germany, assignor to Farbenfabriken Bayer Aktiengesellschaft, Leverkusen, Germany, a corporation of Germany No Drawing. Filed June 5, 1956, Ser. No. 589,389

1 Claim. (Cl. 260—45.4)

The present invention relates to basic hydrazides which are suitable in polymerization and copolymerization processes.

The polymerization and copolymerization of unsaturated organic compounds such as styrene, methacrylic acid esters, diallyl esters, unsaturated polyesters with vinyl or allyl compounds, is for the most part carried out with the aid of peroxides. Since the polymerization is initiated by radicals, it is a necessary condition to operate at temperatures which are such that an appreciable decomposition of the peroxides into radicals takes place. For example, with benzoyl peroxide, this temperature is in the region of 100° C. The time required for polymerization is considerably increased at substantially lower temperatures.

For this reason, it has already been proposed to use peroxides in combination with certain accelerators by which a decomposition into radicals is initiated at room temperature. Particularly suitable accelerators are derivatives of tertiary aromatic amines, such as for example dimethyl aniline, p-dimethyl amino-toluene and N-dioxyethyl aniline.

Polymerization takes place after a few minutes up to several hours, depending on the quantity of the additive used. For example, the amount of dimethyl aniline can be reduced to 0.05%, based on the unsaturated compound to be polymerized, in order that mixtures of polyesters containing ethylene groups with polymerisable monomers may be substantially polymerised within one hour in the presence of benzoyl peroxide. Other tertiary amines, such as for example compounds of the type

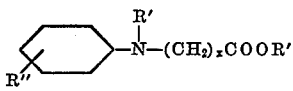

($x=1$–5, R, R', R''=alkyl or aryl) are however not successful with a concentration lower than 0.3%. Polymerization no longer occurs.

It has now been found that basic hydrazides of the formula

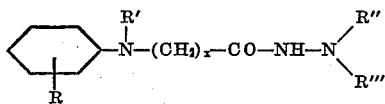

in which $x$ is an integer from 1 to 5, R and R' stand for alkyl, such as methyl, ethyl, propyl, tert. butyl, or for aryl, such as phenyl, or for aralkyl, such as benzyl, R'' and R''' stand for hydrogen or an alkyl such as methyl, ethyl, propyl, tert. butyl, or for aryl, such as phenyl, p-methylphenyl, or for aralkyl such as benzyl, or for acyl such as acetyl, benzoyl, are excellent accelerators for polymerizing and copolymerizing unsaturated organic compounds in the presence of peroxides.

Examples of basic hydrazides of this type are: N-phenyl-N-methyl glycine hydrazide, N-p-methylphenyl-N-methyl glycine hydrazide, N-phenyl-N-ethyl glycine hydrazide, N-phenyl-N-ethyl glycine phenyl hydrazide, N-p-methylphenyl-N-methyl glycine acetyl hydrazide, N-phenyl-N-methyl glycine-as. phenylmethyl hydrazide, N-phenyl-N-methyl-aminopropionic acid hydrazide, N-phenyl-N-methyl-amino-butyric acid hydrazide, N-phenyl-N-methyl-amino-caproic acid hydrazide. They can be prepared for example by the action of hydrazine or its derivatives on the corresponding esters.

The novel compounds are suitable for the polymerization of unsaturated compounds with the terminal grouping $CH_2=CR-$ (R=H or alkyl, such as methyl, ethyl, butyl), such as styrene, $\alpha$-methylstyrene, nuclear substituted styrene such as p- or o-methyl styrene, vinyl acetate, vinyl chloride and bromide, esters of acrylic, methacrylic and maleic acid with alcohols, such as methyl-, ethyl-, butyl-, octyl-, dodecyl-, octadecyl- and benzyl alcohol, acrylonitrile, diallyl esters (such as phthalic acid diallyl ester or tetrachloro-phthalic acid diallyl ester) cyanuric acid triallylester, maleic acid half esters and maleic acid anhydride, divinyl benzene and butadiene as well as its derivatives such as chloro-, methyl- and dimethyl butadiene. It is of course also possible for mixtures of such unsaturated monomers to be copolymerized with one another. This novel class of compounds is of particular interest for initiating the copolymerization of polymerizable ethylenically unsaturated compounds with unsaturated copolymerizable polyesters which are obtained for example by thermal esterification of polyvalent alcohols with unsaturated and saturated dicarboxylic acids or their anhydrides. Suitable polyvalent alcohols are for instance glycol, glycerine, trimethylol propane, butanediol, hexanediol and hexanetriol. Examples of suitable dicarboxylic acids and anhydrides thereof are maleic acid, maleic acid anhydride, succinic acid, succinic acid anhydride, adipic acid, phthalic acid and phthalic acid anhydride. The said catalysts are also suitable for accelerating the polymerization of liquid polymerizable organic compounds, which are mixed with polymers in powder form and are used for the production of shaped elements, particularly in the dental field.

As liquid polymerizable organic compounds which can be polymerized by the novel accelerators there come into consideration for instance acrylic acid and methacrylic acid esters with methyl, ethyl, butyl, and dodecyl alcohols. As polymers there come into question for instance polymethacrylic acid methyl ester and copolymers of vinyl-chloride.

In addition to their usefulness in block polymerization, basic hydrazides to be used according to the invention may also be employed with advantage as accelerators in solvent, emulsion and suspension polymerization.

It was not to be expected that the basic hydrazides claimed would have such a strong action in accelerating polymerization, since as already mentioned, their corresponding esters are ineffective at a concentration below 0.3%. Moreover, aromatic acid hydrazides such as benzoyl hydrazides in the presence of benzoyl peroxide only have a very insignificant effect in accelerating the polymerisation of unsaturated polyesters with vinyl compounds. It is only when a tertiary aromatic nitrogen is combined with a hydrazine group within one molecule that polymerisation is greatly accelerated at room temperature in combination with peroxides. The accelerators of the invention are preferably applied in quantities of 0.01 to 1 percent calculated on the amount of the polymerizable components. Furthermore, the novel compounds form colorless substances which, unlike the known tertiary amine accelerators, are not discolored in light. Substantially colorless polymers or copolymers are thus obtained.

The following examples illustrate the action of these novel accelerators. In these examples, the parts indicated are by weight.

Example 1

20 parts of monomethyl maleic acid ester, 30 parts of styrene and 0.25 part of N-methylphenyl-N-methylglycine hydrazide are stirred with 1 part of benzoyl peroxide at room temperature. After 10 minutes the mixture has increased in temperature so that cooling is necessary, whereby the solution becomes gradually more and more viscous. After 1 hour the solution has become solid and the copolymer produced is soluble.

Example 2

30 parts of styrene, 10 parts of methylester of methacrylic acid and 10 parts of monoethyl esther of maleic acid are stirred with 0.25 part of N-methylphenyl-N-ethyl glycine hydrazide and 1 part of benzoyl peroxide. After 10 minutes the solution becomes very warm and after further 5 minutes the solution reaches the boiling point. For controlling the polymerization it is necessary to cool with ice water. After 1 hour a solid fusible polymer is produced.

Example 3

10 parts of styrene, 5 parts of monoallyl ester of maleic acid and 5 parts of divinyl benzene are stirred with 0.15 part of N-methylphenyl-N-methyl-$\beta$-amino-propionic acid hydrazide and 0.5 part of benzoyl peroxide. After 10 minutes the solution begins to increase in temperature and to gel. After 1 hour a high molecular weight crosslinked resin is produced which is insoluble and infusible.

Example 4

20 parts of monomethyl ester of maleic acid and 30 parts of styrene are dissolved in 100 parts of thiophene-free benzene and thereto are added 0.25 part of N-methylphenyl-N-methyl glycine hydrazide and 1 part of benzoyl peroxide. The polymerization starts after 10 minutes with self-heating and is finished after 1 hour. The copolymer produced can be filtered.

Example 5

100 parts of styrene, 50 parts of ethyl ester of methacrylic acid are emulsified in 1000 parts of water containing 20 parts of tertiary butyl naphthalene sulfonic acid. Thereto are aded 0.75 part of N-ethylphenyl-N-methyl glycine hydrazide and 3 parts of benzoyl peroxide which is dissolved in 20 parts of methacrylic acid ethyl ester. At room temperature the polymerization starts after 15 minutes with self-heating and is finished after a further 50 minutes.

I claim:

In a process wherein an ethylenically unsaturated polymerizable monomer containing a terminal vinylidene group, $CH_2=C<$ is polymerized in the presence of an initiator consisting essentially of a free radical-generating peroxide catalyst and a polymerization activator, the improvement comprising adding to the polymerization mixture as the activator 0.01–1%, calculated on the amount of monomers, of a compound of the general formula

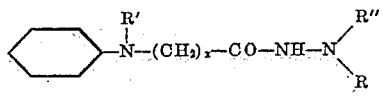

in which formula $x$ is an integer from 1 to 5, $R'$ stands for a member selected from the group consisting of lower alkyl and aralkyl, and $R''$ and $R'''$ stand for a member selected from the group consisting of hydrogen, lower alkyl, phenyl, aralkyl, and acyl.

References Cited in the file of this patent

UNITED STATES PATENTS

| | | |
|---|---|---|
| 2,606,893 | Reynolds et al. | Aug. 12, 1952 |
| 2,686,775 | Howard | Aug. 17, 1954 |

OTHER REFERENCES

Offe et al.: Zeitschrift fur Naturforschung, vol. 7B, pages 446–462 (1952).